United States Patent [19]

Burton

[11] Patent Number: 5,707,133

[45] Date of Patent: Jan. 13, 1998

[54] AUTOMOBILE HEADLAMP ADJUSTER

[75] Inventor: John E. Burton, Ludington, Mich.

[73] Assignee: Burton Technologies, Ludington, Mich.

[21] Appl. No.: 584,693

[22] Filed: Jan. 11, 1996

[51] Int. Cl.⁶ ........................................... B60Q 1/068
[52] U.S. Cl. ...................... 362/66; 362/267; 362/273; 362/289; 362/428; 33/288; 116/281; 116/285
[58] Field of Search ........................ 362/66, 267, 273, 362/285, 287, 289, 418, 427, 428; 33/264, 288; 116/281, 283, 285, 290, 309, 318, 321, 323

[56] References Cited

U.S. PATENT DOCUMENTS

| | | | |
|---|---|---|---|
| 4,574,334 | 3/1986 | Igura | 362/66 |
| 4,731,706 | 3/1988 | Ricard | 362/289 |
| 5,023,759 | 6/1991 | Eckenrode | 362/66 |
| 5,068,769 | 11/1991 | Umeda et al. | 362/289 |
| 5,077,642 | 12/1991 | Lisak | 362/66 |
| 5,343,372 | 8/1994 | Shirai et al. | 362/66 |
| 5,351,170 | 9/1994 | Nagengast et al. | 362/66 |
| 5,381,313 | 1/1995 | Choji | 362/66 |
| 5,452,185 | 9/1995 | Arlon et al. | 362/66 |

*Primary Examiner*—Alan Cariaso
*Attorney, Agent, or Firm*—Warner Norcross & Judd

[57] ABSTRACT

An adjuster mechanism having an aiming device carried on the shaft of the ball stud. The adjuster mechanism includes a gear housing having a track for guiding the aiming device and an indicator for reading the position of the aiming device. The adjuster mechanism also includes a gland for sealing the headlamp housing. The gland is fitted over the shaft of the ball stud and is squeezed between the headlamp housing sealing bore and the ball stud shaft. The bearing surfaces of the gear housing and sealing bore are slanted to automatically center the ball stud. The adjuster mechanism further includes an anti-rotation insert seated within a cover. The insert engages a groove in the shaft of the ball stud to prevent rotation of the ball stud within the gear housing.

25 Claims, 6 Drawing Sheets

AUTOMOBILE HEADLAMP ADJUSTER

BACKGROUND OF THE INVENTION

The present invention relates to adjuster mechanisms, and more particularly to a headlamp adjuster mechanism for an automobile.

There is a growing trend in the automobile industry to use internally adjustable reflector headlamps. Internally adjustable headlamps include a reflector and bulb socket assembly enclosed within a sealed headlamp housing and lens. The orientation of the reflector within the housing is adjustable to control the direction of the light beam cast by the headlamp. Typically, the adjustable reflector is supported by three ball studs that extend from the rear of the headlamp housing and fit within sockets located in three corners of the reflector. The middle ball stud is secured directly to the headlamp housing to provide a fixed pivot point for the reflector. The other two ball studs are connected to a pair adjuster mechanisms secured to the rear of the headlamp housing. By operating the adjuster mechanisms, these two ball studs can be extended and retracted to control the horizontal and vertical orientation of the reflector.

A conventional adjuster mechanism includes a pair of bevel gears supported within a gear housing. The first gear is rigidly connected to a drive shaft extending from the gear housing. The second gear surrounds and threadedly engages the ball stud. The two gears are meshed so that movement of the drive shaft results in rotational movement of both bevel gears. The ball stud is mounted so that it can not rotate within the gear housing. As a result, the ball stud moves linearly as the second gear rotates. Several techniques are used in commercially available adjuster mechanisms to prevent the ball stud from rotating within the gear housing. The first technique is to specially adapt the head of the ball stud and the reflector socket so that the ball stud cannot rotate within the socket. This arrangement requires specially manufactured reflectors and is not possible in many designs because of assembly restrictions.

A second technique is to adapt the geometry of the ball stud and gear housing to prevent relative rotation between them. For example, in one commercially available adjuster mechanism, a flat is milled along the shank of the ball stud to provide a D-shaped cross-section. The D-shaped threaded shank then fits into a D-shaped guide hole in the modified gear housing. The two flat surfaces engage and restrain rotation of the ball stud within the gear housing.

This technique has a number of disadvantages. First, machining a flat along the shank of the ball stud reduces its cross sectional area and weakens the ball stud.

Second, machining the flat and tapping internal threads into the gear which receives the ball stud are costly secondary operations which must be performed prior to assembling the adjuster mechanism. Tapping the gear before assembly is necessary because the torque forces which would be required to efficiently form threads while assembling the ball stud would be too great. Torque's forces equal to those generated at the gear/ball stud interface during thread forming would also act on the housing at the D-shaped guide hole which constrains rotation of the ball stud. Such elevated torque levels could distort the threads of the ball stud and the gear housing at the guide hole interface.

And third, tapping the threads into the gear prior to assembly results in a lower resistance to vibration. Tapped threads, unlike formed threads, provide a non-interference fit, allowing ball stud threads to engage the threaded bore of the gear with clearance between the mating threads. The clearance space minimizes friction between the members and allows the gear to rotate about the ball stud with very little resistance. This ease of operation becomes a detriment when the adjuster assembly is expected to hold the headlamp reflector in a given position under vibration.

It is important to completely seal the headlamp housing to prevent the accumulation of moisture. The adjuster mechanism ball stud penetrates the rear wall of the headlamp housing and therefore must be sealed. Typically this area is sealed by an o-ring seated between the gear housing and the headlamp housing, an o-ring seated around the drive shaft within the gear housing, and by a cap mounted to the gear housing over the free end of the ball stud by sonic welding. The drive shaft o-ring and ball stud cap significantly increase the cost and complexity of the manufacturing process. They also provide additional seals that are subject to failure. Alternatively, the headlamp housing can be sealed by an o-ring seated between the gear housing and the headlamp housing and by grease injected into the gear housing. Grease increases the cost of manufacture and may seep from the gear housing, possibly contaminating the headlamp housing and breaching the seal.

Federal law requires each adjuster mechanism to be equipped with a vehicle headlamp aiming device (VHAD). A vehicle headlamp aiming device displays the angular position of the reflector. The graduations on the VHAD are subject to certain visibility requirements. One commercially available headlamp adjuster includes a disc-shaped VHAD fit over the drive shaft. The disc-shaped VHAD includes raised graduations spaced around its circumferential edge. When the drive shaft is rotated, the disc rotates resulting in rotation of the graduations. An indicator is provided on the gear housing from which to gauge movement of the VHAD. This VHAD only works with adjuster mechanisms that can be properly adjusted in less than a single rotation of the drive shaft. The raised graduations can also be difficult to read in low light conditions.

SUMMARY OF THE INVENTION

The aforementioned problem are overcome by the present invention in which an adjuster mechanism is provided with an aiming device carried by the ball stud. The aiming device is guided by a track on the gear housing and preferably includes a clothes pin style clip that clamps to the shaft of the ball stud. The clip also performs a locating function. To install the aiming device, the clip is pinched to fit over the shaft and the aiming device is slid into the track. The pinched clip abuts the from of the track when the aiming device is properly located. When the clip is released, it opens enough to clear the track and allow the aiming device to travel in both directions along the track.

The aiming device is notched to provide graduations, and preferably contrasts in color with the gear housing so that the graduations are plainly visible. The gear housing includes an indicator for reading the graduations. The indicator preferably extends over the contrasting aiming device so that it is highly visible. The aiming device also includes directional designators for indicating whether the reflector is left or right of center (or above or below horizontal). The directional designators are preferably cored through the aiming device so that the gear housing is visible therethrough.

The aiming device is simple to manufacture, easy to install, and includes highly visible graduations. Further, the indicator and graduations are located adjacent the drive shaft where they are easily viewed. Additionally, the clip and track cooperate to provide a non-visual method for locating the clip in the default position.

In a second aspect, the adjuster mechanism includes a gland around the ball stud and a three-point mounting arrangement that prevents rupture of the gland seal during side-loading of the ball stud. The gland is a large o-ring seal that is squeezed between the ball stud shaft and the sealing bore of the headlamp housing. The gear housing and headlamp housing mounting bore each include slanted surfaces that automatically center the ball stud within the mounting bore.

The gland and three-point mounting arrangement provide significant cost benefits over conventional apparatus because they eliminate the need for multiple seals, ball stud caps, sonic welding and grease. The present invention is highly reliable because it includes only a single seal. Additionally, the gland is visible, thereby simplifying inspection and quality control.

In a third aspect, the adjuster mechanism includes an inexpensive metal anti-rotation insert that prevents rotation of the ball stud within the gear housing. The anti-rotation insert is separately attached inside the gear housing cover and includes tynes that engage a pair of longitudinal grooves on the shaft of the ball stud.

The anti-rotation insert withstands a high level of applied torque and will function with narrow grooves that do not significantly reduce the cross sectional area and weaken the ball stud. These grooves can be extruded into the ball stud shank prior to the thread rolling operation, eliminating costly secondary milling operations.

Using a separate anti-rotation insert allows the ball 'stud to rotate within the housing and be driven through the bore of an untapped plastic gear during the first phase of the adjusters assembly process. The anti-rotation insert can then be installed into the housing after thread forming is completed. Thread forming during assembly eliminates a costly secondary tapping process.

The interference fit produced by thread forming during assembly also gives the finished assembly good vibration resistance. The friction between ball stud and gear keeps the ball stud in its adjustment position until the drive screw of the gear assembly is manually adjusted, moving the ball stud into a new position.

Furthermore, since the anti-rotation insert can be installed behind the gear housing, the ball stud can have a fully circular cross sectional geometry where it passes through a circular opening in the front of the gear housing. A simple and reliable o-ring type seal can then be used to seal the gear drive assembly to the headlamp.

The preferred method for employing the anti-rotation insert as a zinc die-cast insert that is trapped in between the plastic cover and the plastic gear housing. This allows removal of the anti-rotation insert without costly redesign of the cover or gear housing for headlamp applications that do not require this feature.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
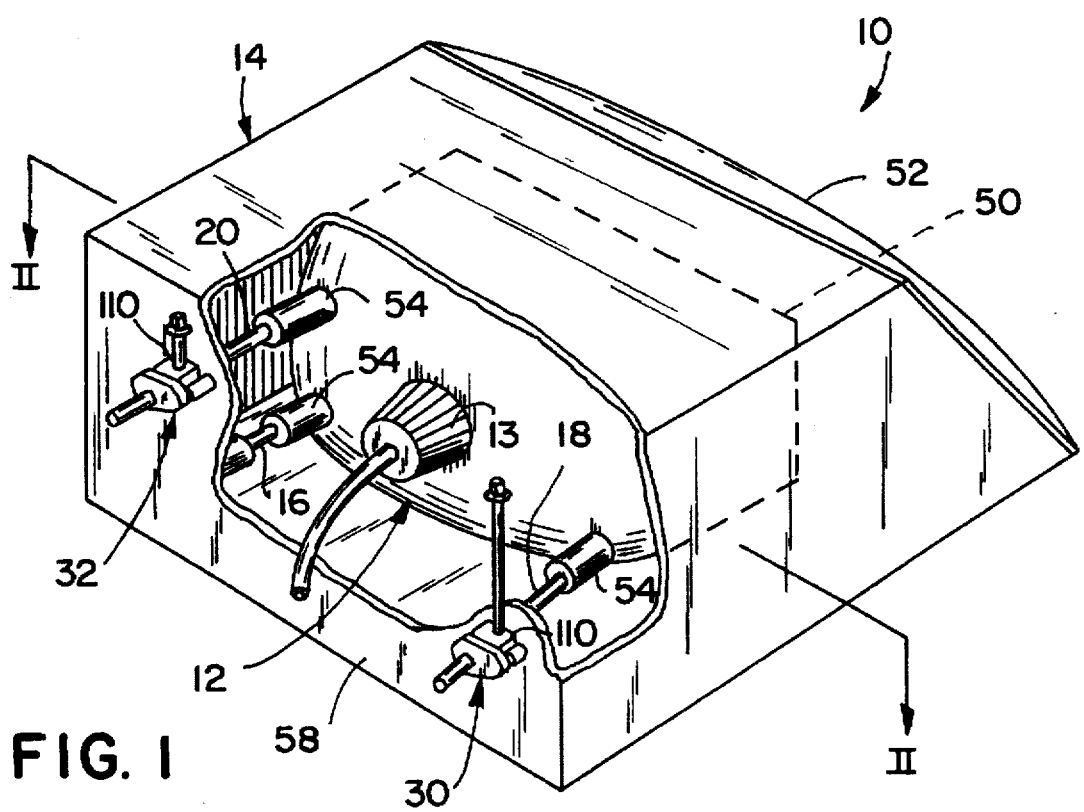
FIG. 1 is a partially sectional perspective view of the headlamp.
Figure 3:
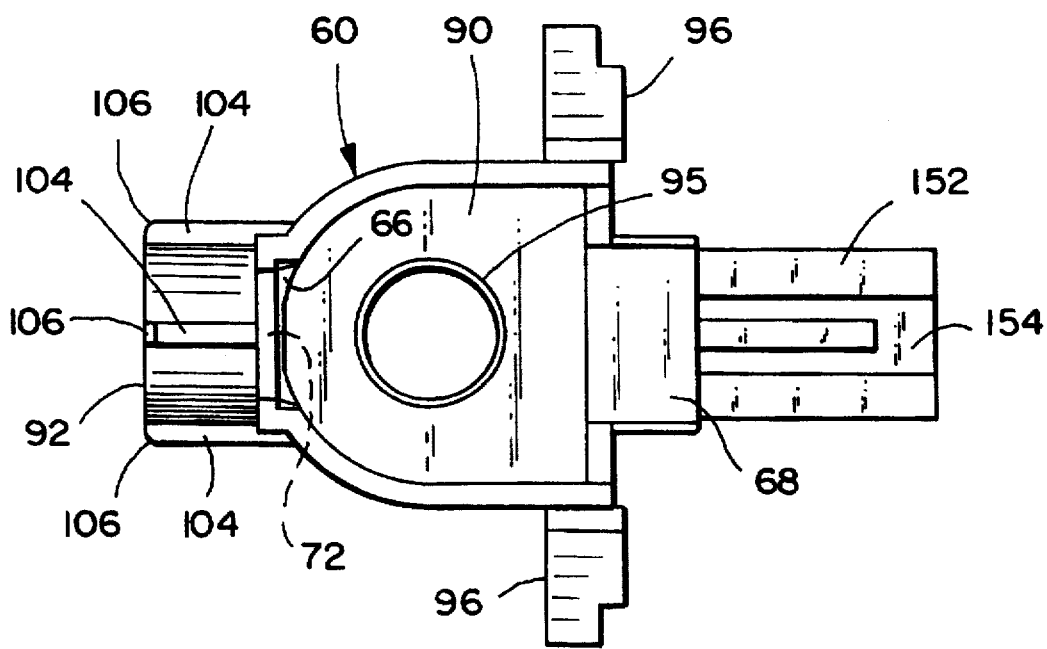
FIG. 3 is bottom plan view of the gear housing.

An automobile headlamp incorporating a pair of adjuster mechanisms according to a preferred embodiment of the present invention is illustrated in FIG. 1, and generally designated 10. The headlamp 10 is a generally conventional internally adjustable reflector headlamp which includes a reflector 12 and bulb assembly 13 enclosed within a headlamp housing 14 and lens 52. The direction of the light beam cast by the headlamp 10 is controlled by the orientation of the reflector 12. The orientation of the reflector 12 is controlled by adjuster mechanisms 30 and 32 secured to the rear of the headlamp housing 14. Adjuster mechanism 30 controls the horizontal orientation of the reflector 12 and adjuster mechanism 32 controls the vertical orientation of the reflector 12.

Figure 2:
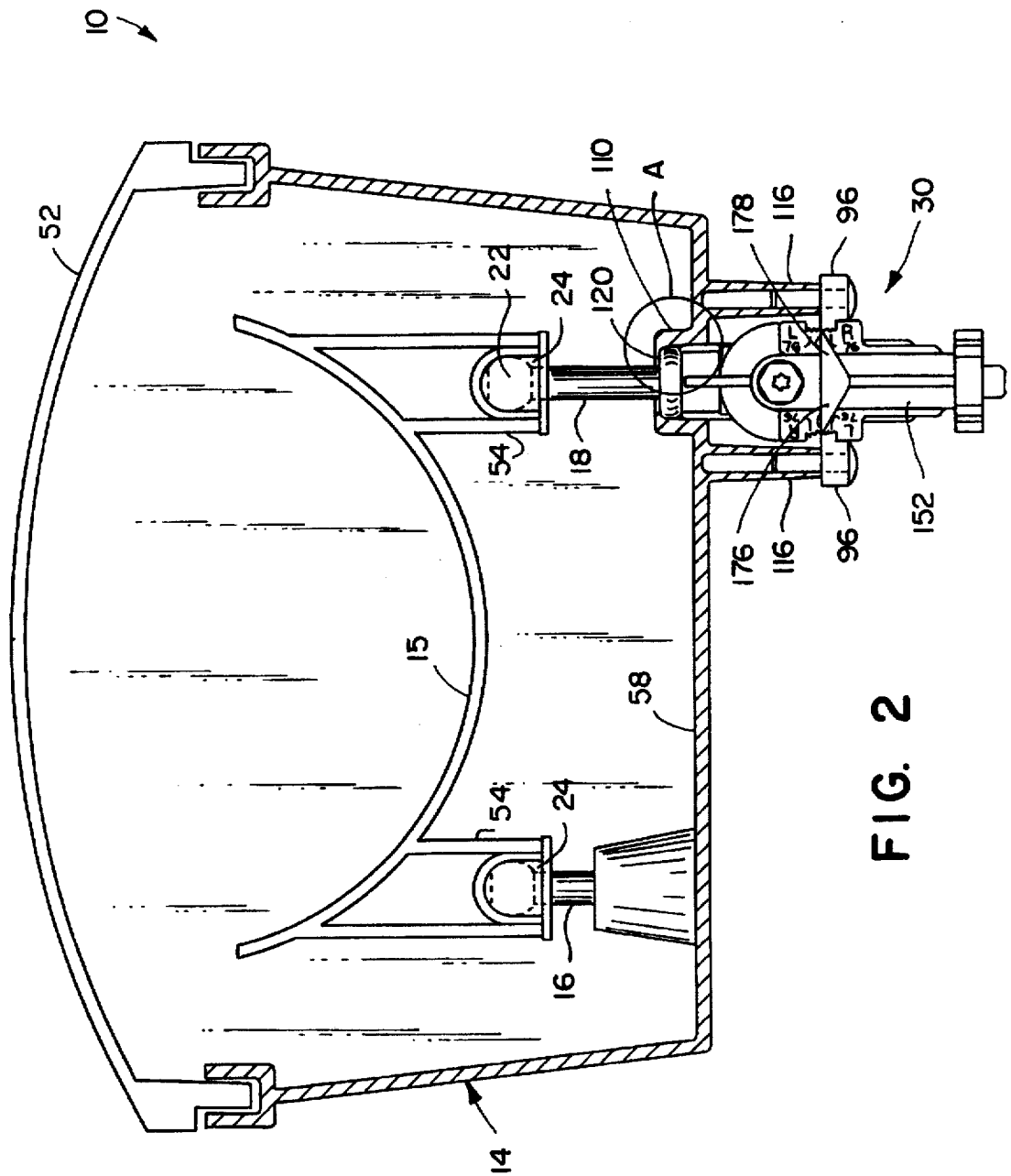
FIG. 2 is a sectional view of the headlamp taken along line II—II in FIG. 1.
Figure 13:
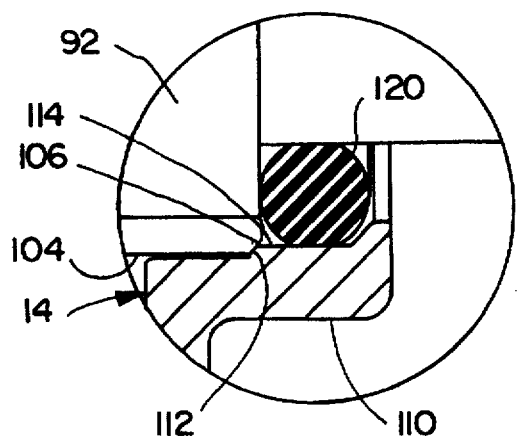
FIG. 13 is an enlarged view of Section A of the headlamp in FIG. 2.

The headlamp housing 14 includes an open wall 50 through which the light beam is cast. The open wall 50 is covered by a conventional lens 52 to seal the housing 14 and diffuse the light beam. The headlamp housing 14 is mounted to the body of the vehicle in a conventional manner using conventional techniques. Three ball studs 16, 18, and 20 extend inwardly from the rear wall 58 of the housing 14 to support the reflector 12. Each ball stud includes a generally spherical head 22 that snap fits with the reflector 12 as described below (See FIG. 2). Ball stud 16 is rigidly secured to the headlamp housing 14 to provide a fixed pivot point for the reflector. The other two ball studs 18 and 20 extend through the rear wall 58 from adjuster mechanisms 30 and 32, respectively. These ball studs 18 and 20 are linearly adjustable by operation of adjuster mechanisms 30 and 32. The headlamp housing 14 includes a pair of mounting bores 110 for mounting the adjuster mechanisms 30 and 32 to the outside of the headlamp housing 14. As perhaps best illustrated in FIG. 13, each mounting bore 110 includes a slanted bearing surface 112 which engages the adjuster mechanism and a sealing bore 114 which seats a gland 120 for sealing the headlamp housing 14. A pair of screw bosses 116 extend from opposite sides of the mounting bore 110.

The reflector 12 (bulb and bulb access port not shown) is generally conventional, and therefore will not be described in detail. Suffice it to say that the reflector 12 includes a curved reflecting surface 15 and three rearwardly extending mounting posts 54 located in three corners of the reflector. Each of the mounting posts 54 includes a socket 24 adapted to receive the head 22 of the corresponding ball stud 16, 18, and 20. The reflector 12 is installed within the headlamp housing 14 by snap-fitting the mounting posts 54 onto the ball studs 16, 18, and 20 (See FIG. 2).

The adjuster mechanisms 30 and 32 control the linear position of ball studs 18 and 20, and consequently the orientation of the reflector 12 within the headlamp housing 14. The two adjuster mechanisms 30 and 32 are generally identical, and therefore only adjuster mechanism 30 will be described in detail. Referring now to FIGS. 3–6, adjuster mechanism 30 includes gear housing 60, ball stud 18, drive shaft 44, and gear assembly 46. Gear housing 60 defines a void 90 for receiving the gear assembly 46, ball stud 18, and drive shaft 44. The gear housing 60 also defines a first neck 92 to receive ball stud 18. This neck 92 is dimensioned to fit within the headlamp housing mounting bore 110. A plurality of radially symmetric ribs 104 (preferably four) extend longitudinally along the exterior of neck 92. The free end 106 of each rib is slanted. The slanted ends 106 engage bearing surface 112 to center the adjuster mechanism 30 within the mounting bore 110 (See FIG. 13). The gear housing 60 also defines a second neck 94 to receive drive shaft 44. The second neck 94 defines a seat 95 for rotatably supporting the first bevel gear 40 as described below. The two necks 92 and 94 are oriented at right angles to each other. The housing 60 also defines a slot 72 which receives a tab 71 for securing cover 62 to the housing 60 and a pair of arcuate seats 66 and 68 for rotatably supporting the second bevel gear 42. In addition, a pair of mounting ears 96 extend from the housing 60 for securing the adjuster mechanism 30 to the headlamp housing 14.

Gear housing 60 further includes a track 150 for guiding the aiming device 160 as described below. Track 150 extends from neck 94 parallel to ball stud 18. The track 150 includes spaced-apart upper and lower blades 152 and 154 which support and shepherd the aiming device 160. The gear housing 60 further includes an indicator 156 positioned above track 150 for reading the aiming device 160. The indicator 156 includes a pair of pointers 176 and 178 that extend from the upper blade 152 in opposite directions over the aiming device 160.

Figure 4:
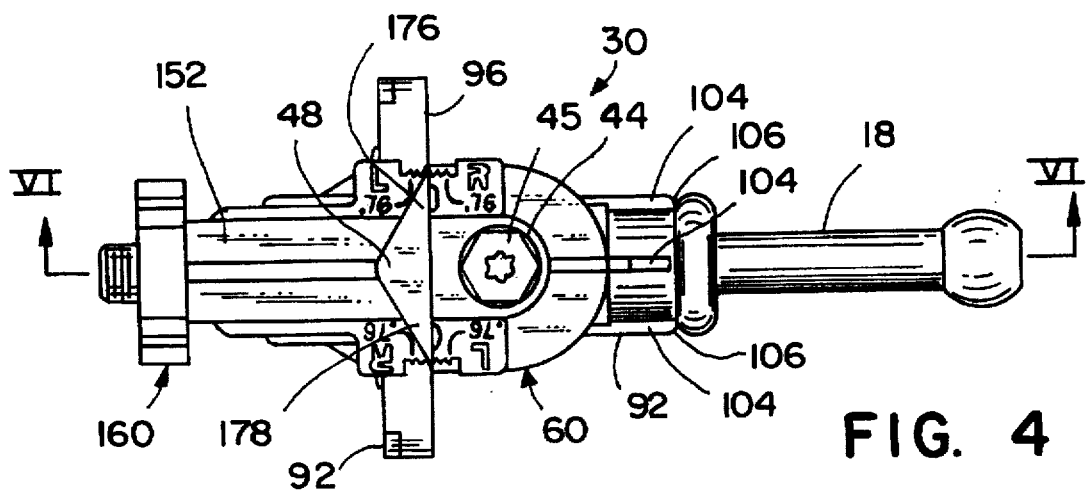
FIG. 4 is a top plan of the horizontal adjuster mechanism.
Figure 5:
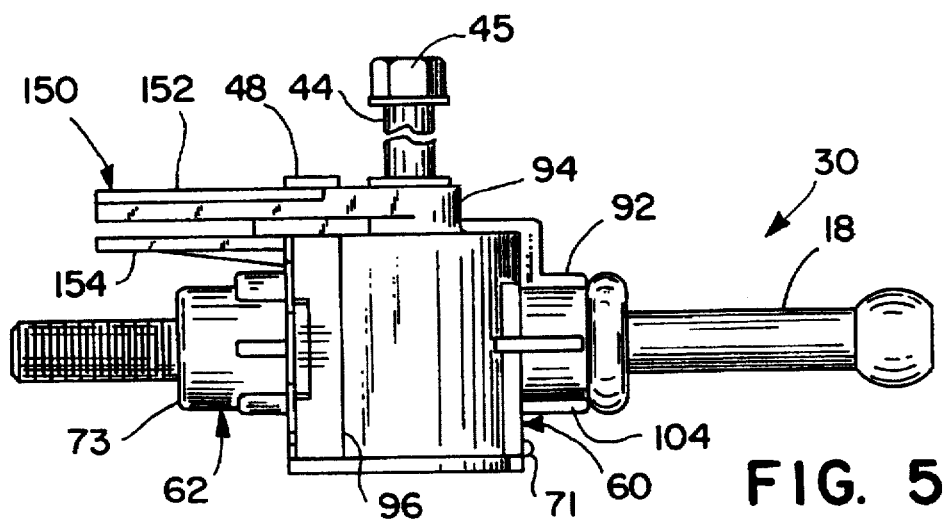
FIG. 5 is a side elevational view of the horizontal adjuster mechanism without the aiming device.

The drive shaft 44 includes a torx head 45 and penetrates the gear housing 60 at neck 94 (See FIGS. 4 and 5). The end of the drive shaft 44 located within the gear housing 60 is connected directly to the first bevel gear 40. The length of the drive shaft 44 is selected to make the torx head 45 easily accessible for adjustment.

Figures 10, 11:
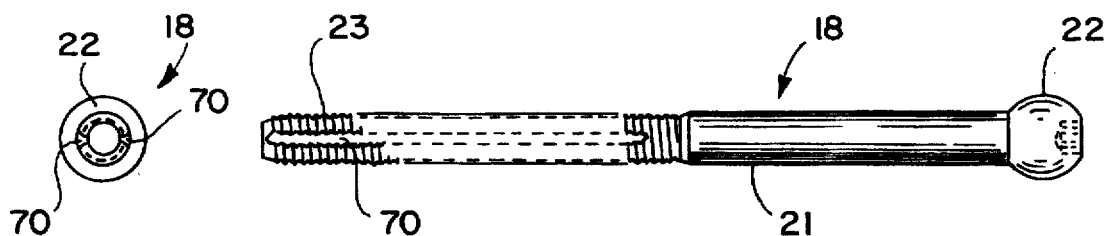
FIG. 10 is a side elevational view of the ball stud.
FIG. 11 is a rear end view of the ball stud.

Referring now to FIGS. 10 and 11, the ball stud 18 includes a ball-shaped head 22 and a shaft 21 that extends through the gear housing 60 at neck 92. A section 23 of the shaft is threaded to threadedly interact with the second bevel gear 42. A pair of longitudinal grooves 70 extend along opposite sides of the threaded section 23 of the shaft 21. The grooves 70 cooperate with insert 78 to prevent rotation of the ball stud 18 as described below.

Figure 6:
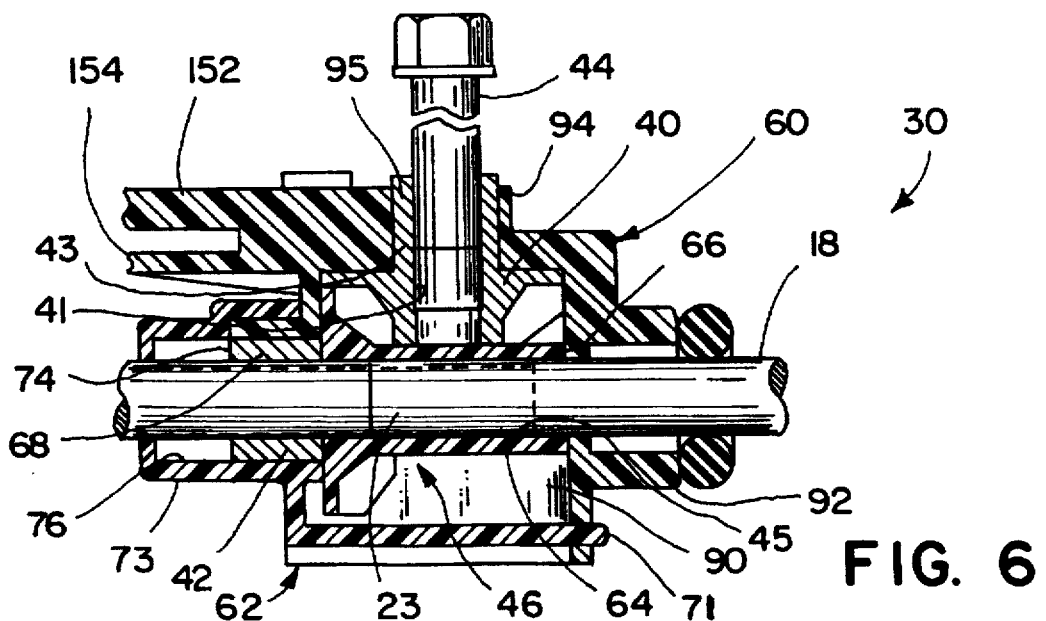
FIG. 6 is a sectional view of the horizontal adjuster mechanism taken along line VI—VI in FIG. 4.

The gear assembly 46 includes a pair of conventional meshed, bevel gears 40 and 42 that translate rotational movement of drive shaft 44 into linear movement of ball stud 18 (See FIG. 6). The two gears 40 and 42 are orientated 90 degree from each other. The first bevel gear 40 includes a collar 43 surrounding a concentric bore 41 which receives the end of the drive shaft 44. The collar 43 is rotatably seated within the gear housing 60 in seat 95. The second bevel gear 42 includes a concentric, elongated sleeve 64 that defines a threaded, concentric bore 45. The sleeve 64 is threadedly fitted over the threaded section 23 of ball stud 18. The second gear 42 is rotatably supported in the gear housing 60 by seats 66 and 68 which receive and support opposite ends of sleeve 64.

Figure 14:
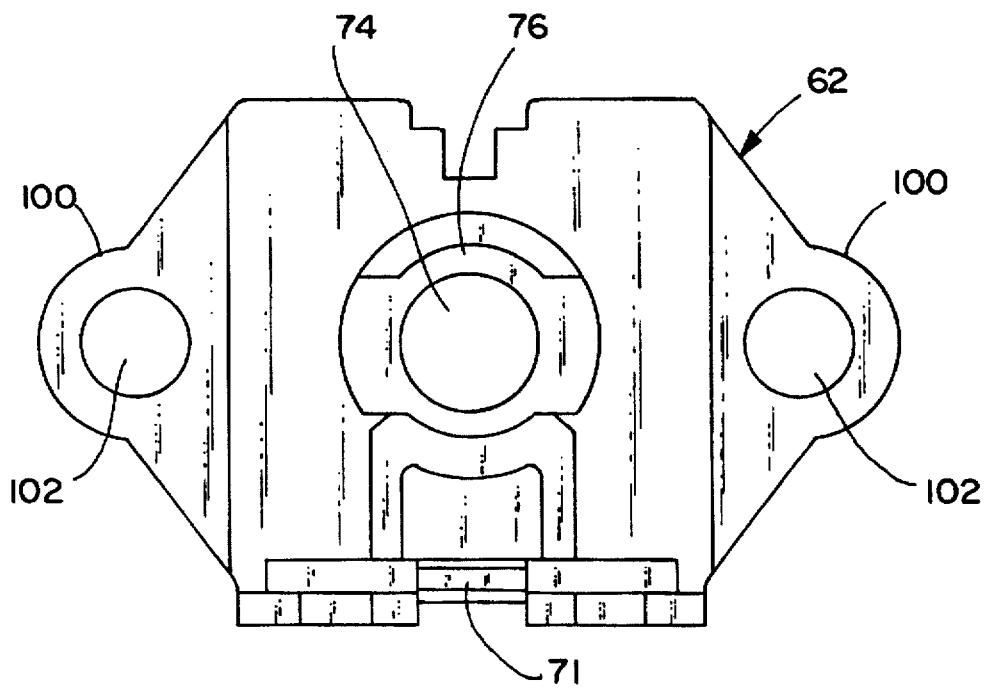
FIG. 14 is a rear elevational view of the cover.

As perhaps best illustrated in FIGS. 5 and 6, the adjuster mechanism 30 also includes a cover 62 for closing the gear housing 60. The cover 62 is generally L-shaped and is secured to the gear housing 60 by a tab 71 that is snap-fitted within slot 72. The cover 62 includes a neck 73 that is fitted over seat 68. The neck 73 defines a concentric opening 74 allowing ball stud 18 to extend from the gear housing 60. The cover 62 also defines a non-circular seat 76 within neck 73 for receiving seat 68 and anti-rotation insert 78. The cover 62 includes a pair of mounting ears 100 that coextend with gear housing mounting ears 96 (See FIG. 14). The ears 100 define mounting holes 102.

Figure 12:
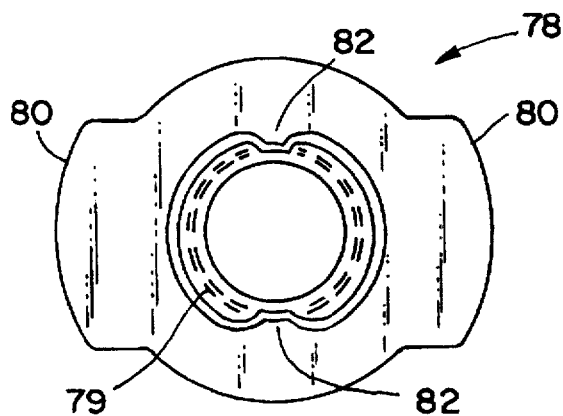
FIG. 12 is a front elevational view of the insert.

The anti-rotation insert 78 prevents the ball stud 18 from rotating within the housing 60. Referring now to FIG. 12, the insert 78 includes a pair of ears 80 that extend outwardly to engage the non-circular seat 76 and prevent rotation of the insert 78. Alternatively, the insert 78 and seat 76 can be provided with other noncircular shapes to prevent relative rotation. The insert 78 defines a concentric bore 79 and includes a pair of tynes 82 that extend into the bore 79 to interfit with grooves 70 and prevent rotation of the ball stud 18. The number and shape of the tynes can vary as desired. However, the insert 78 preferably includes a pair of lobed tynes that interfit with radial shaped grooves as shown in the drawings. This unique profile reduces contact stress on the tynes when subject to adjustment torque and eases extruding forces in the manufacturing of the ball stud whereby improving tool life. Alternatively, the insert 78 can be eliminated and the cover 62 itself can be provided with tynes to engage grooves 70 and prevent rotation of the ball stud 18. If desired, the cover 62 can be manufactured from high strength plastic or metal to provide additional strength.

As noted above, a gland 120 is seated between the adjuster mechanism 30 and the headlamp housing 14. The gland 120 is an o-ring type seal that is fitted over the shaft 21 of ball stud 18. The outer diameter of the o-ring is slightly larger than the inner diameter of sealing bore 114 and the inner diameter of the o-ring is slightly smaller than the outer diameter of shaft 21. Consequently, the o-ring is squeezed between the shaft and the sealing bore to provide a leaktight seal.

Figure 7:
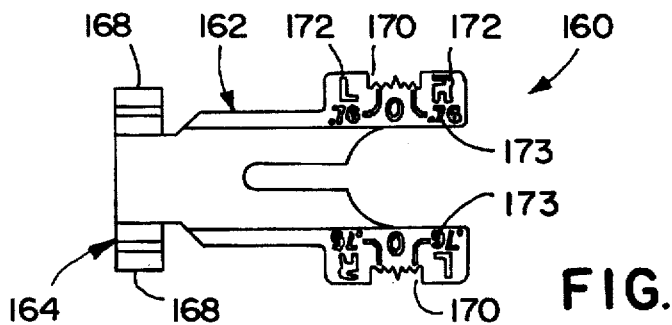
FIG. 7 is a top plan view of the aiming device.
Figures 8, 9:
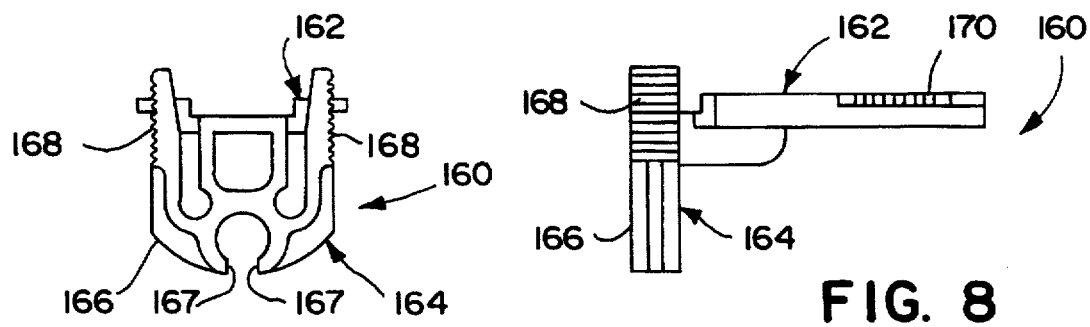
FIG. 8 is a side elevational view of the aiming device.
FIG. 9 is a front elevational view of the aiming device.

Adjuster mechanism 30 is provided with a vehicle headlamp aiming device 160. The aiming device 160 is preferably manufactured from plastic and contrasts in color with the gear housing 60. As illustrated in FIGS. 7–9, the aiming device 160 is generally L-shaped and includes a display portion 162 and an attachment portion 164. The display portion 162 defines a plurality of evenly-spaced notches 170 which function as graduations 171 for indicating how far the ball stud 18 is from center. The aiming device 160 also includes raised numerical designations 173 for at least some of the graduations 170. The aiming device 160 further includes directional designations 172 for indicating whether the ball stud 18 is left or right of center. The directional designations 172 preferably include the letters "L" and "R" (Left and Right) cored through the display portion 162 on opposite sides of notches 170. As noted above, adjuster mechanism 32 controls the vertical orientation of the reflector. Consequently, the directional designators for adjuster mechanism 32 are preferably "U" and "D" (Up and Down).

Figure 17:
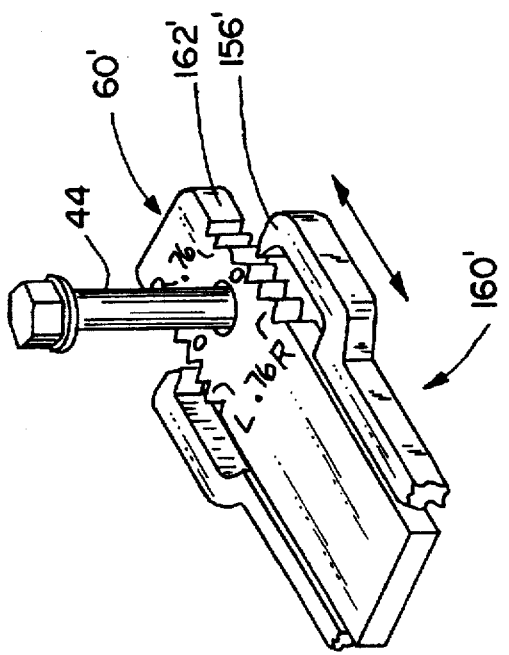
FIG. 17 is a perspective view of a portion of an alternative adjuster mechanism.

As illustrated, a complete set of graduations 171 and designators 172, 173 are provided along each side of the display portion 162. The directional designators 172 are reversed on opposite sides so that the aiming device 160 works appropriately when installed on either side of the vehicle. On both sides of the vehicle, the graduations and designators located toward the outside of the vehicle provide the correct reading. The other set of graduations and designators are preferably hidden from sight behind a shelf or other portion of the vehicle's body. If desired, the graduations 171 and designations 172, 173 can be incorporated into the gear housing 60' and the indicator 156 can be incorporated into the aiming device 160' (See FIG. 17). In this embodiment, the gear housing 60' includes the graduations 171' and designation 172', 173', and the aiming device 160' includes indicators 156' pointing inwardly toward the housing 60'.

Figure 18:
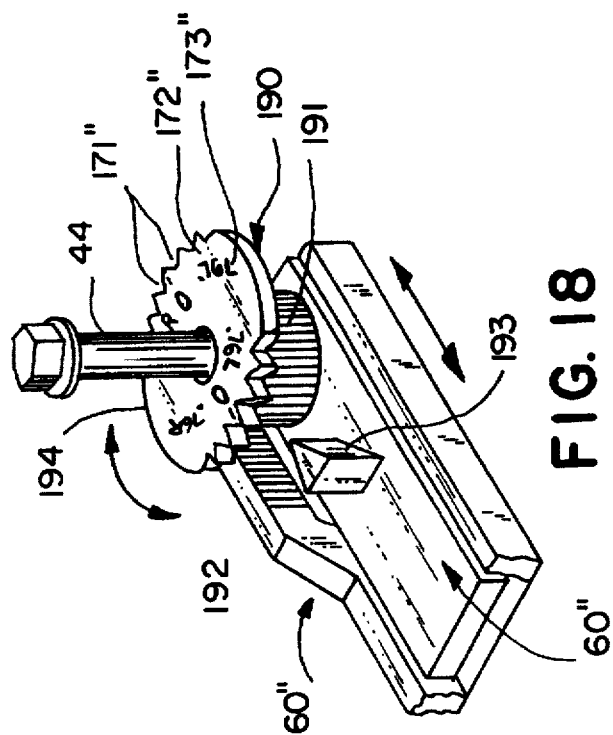
FIG. 18 is a perspective view of a portion of a second alternative adjuster mechanism.

Alternatively, the display portion 162 of aiming device 160 can be replaced by a separate rotating display 190 fit over the drive shaft 44 (see FIG. 18). In this embodiment, aiming device 160" includes a serrated arm 192 that replaces display portion 162 and the gear housing 60" includes a raised indicator 193 for reading the display 190. The display 190 freely rotates around the drive shaft 44 and includes a display disc 194 and a concentric collar 191. The display disc 194 is notched to provide the desired graduations 171". Additionally, the upper surface of the display disc 194 includes the desired designations 172", 173". The outside wall of the collar 191 is serrated to interact with the serrated arm 192 of the aiming device 160". As the aiming device 160" moves linearly with the ball stud 18, the serrated arm 192 engages the serrated collar 191 causing the display disc 194 to rotate around the drive shaft 44. The graduations 171", and designations 172", 173" cooperate with the indicator 193 to provide a visual display of the position of the ball stud 18.

The attachment portion 164 of the aiming device 160 includes a clip 166 having jaws 167 and tabs 168 for opening jaws 167. The jaws 167 are adapted to close upon the shaft 21 of the ball stud 18 so that the aiming device 160 moves in unison with the ball stud 18. The aiming device 160 is guided along the gear housing 60 by track 150. When pinched, the tabs 168 will engage the front 153 of the track 150 to locate the aiming device 160 at the default position. When released, the tabs 168 open a sufficient distance to allow the tabs 168 to clear the front 153 of track 150.

Figure 15:
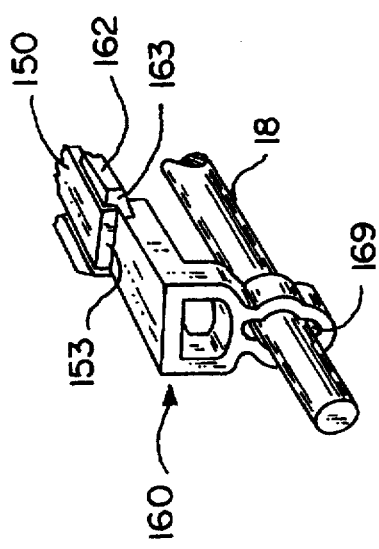
FIG. 15 is a perspective view of a portion of the ball stud and an alternative aiming device.

Alternatively, the tabs 168 may be eliminated from the aiming device 160 and the jaws 167 can be joined to define a bore 169 that fits tightly over the ball stud 18 (See FIG. 15). In this embodiment, the aiming device 160 is located in the default position by sliding it onto the ball stud until the end 163 of the display portion 162 is aligned with the front 153 of the track 150.

Figure 16:
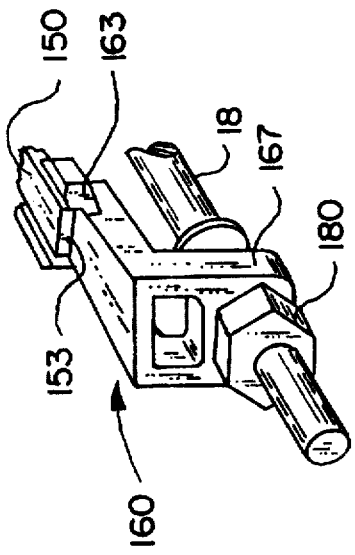
FIG. 16 is a perspective view of a portion of the ball stud and a second alternative aiming device.

As a second alternative, the tabs 168 can be eliminated and the aiming device can include a threaded nut 180 that is threadedly fined over the ball stud 18 (See FIG. 16). In this embodiment, the jaws 167 clamp onto the nut 180 rather than the ball stud 18. The nut 180 is threaded onto the ball stud 18 until the end 163 of the display portion 162 is aligned with the front 153 of the track 150.

MANUFACTURE AND ASSEMBLY

The present invention is manufactured using conventional apparatus and techniques. The headlamp housing 14 is generally conventional except for mounting bores 110 which are specially adapted for use with the gland arrangement of the present invention. Those skilled in the art can easily adapt the headlamp housing to include the appropriate mounting bores 110. For example, if the headlamp housing 14 is molded, the mold can be provided with core pins shaped to provide the mounting bores 110.

The gear housing 60, cover 62, second bevel gear 42, and aiming device 160 are injected molded using conventional apparatus and techniques. The housing 60, cover 62, and bevel gear 42 are preferably manufactured from a black nylon. The aiming device is preferably manufactured from a white polycarbonate.

The drive shaft 44 is preferably manufactured from steel wire. The torx head 45 is formed using a conventional cold heading process. Similarly, the ball stud 18 is manufactured from steel wire with the ball head 22 being formed using a conventional cold heading process. The grooves 70 are extruded into the shaft 23 using a conventional extruding process, and the shaft 23 is threaded using a conventional rolling process.

The first bevel gear 40 and anti-rotation insert 78 are preferably die cast from zinc. Obviously, these components can be manufactured using other conventional materials and techniques.

To assemble the adjuster mechanism 30, the first bevel gear 40 is press fit onto the end of the drive shaft. The drive shaft 44 and bevel gear 40 is inserted into the gear housing 60 through neck 94. Next, the second bevel gear 42 is fitted into the gear housing 60 within seats 66 and 68. Afterwards, ball stud 18 is inserted into the housing through neck 92. The ball stud 18 is driven into the gear forming its own thread inside sleeve 64 until it reaches the desired position. Next, the anti-rotation insert 78 is placed within cover seat 76 and the cover 62 is installed on the housing 60 with tab 71 snap-fit into slot 72. The gland 120 is placed over the ball stud 18.

Next, the aiming device 160 is installed on the housing 60. The tabs 168 are pinched to open jaws 167. The display portion 162 is then slid into track 150 until the tabs 168 engage the from 153 of the track 150. The tabs 168 are then released causing the jaws 167 to close on shaft 21 so that the aiming device 160 moves linearly with the ball stud 18.

The adjuster mechanism 30 is mounted to the headlamp housing 14 within mounting bore 110. Neck 92 is inserted into mounting bore 110 with ball stud 18 extending into the center of the headlamp housing 14. The gland 120 is sandwiched between the shaft 21 of the ball stud 18 and the inner wall of the sealing bore 114 to provide a leaktight seal. Mounting screws 190 are then installed through ears 96 and 100 into screw bosses 116. As the screws are tightened, the free ends 106 of the neck ribs 104 engage the bearing surface 112 of the mounting bore 110. Because the ribs and bearing surface are slanted, the neck 92 is automatically centered within the mounting bore 110. Further, if the ball stud 18 is side loaded, the ribs and bearing surface prevent sideways movement of the neck 92 within the mounting bore 110. This helps to prevent the seal created by gland 120 from being breached. The same process is repeated for adjuster mechanism 32.

Once both adjuster mechanisms are installed, the reflector 12 and bulb assembly 13 are installed within the headlamp housing 14. The reflector 12 and bulb assembly 13 are manufactured and assembled in a conventional manner. As noted above, the reflector 12 is installed within the headlamp housing 14 by snap-fitting the head 22 of each ball stud into the appropriate socket 24.

In operation, adjuster mechanism 30 controls the horizontal orientation of the reflector 12 and adjuster mechanism 32 controls the vertical orientation of the reflector 12. The reflector 12 can be adjusted along either axis simply by rotating the appropriate drive shaft 44 in the appropriate direction. Rotational movement of the drive shaft 44 causes rotational movement of the first gear 40 and consequently rotational movement of the second gear 42. As the second gear 42 rotates, the ball stud 18 moves linearly. The distance of the ball stud 18 from center is easily determined by viewing the aiming device 160. The contrasting colors of the aiming device 160, the indicator 156, and housing 60 make the graduations 171 and designators 172 highly visible.

The above description is that of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An adjuster mechanism comprising:
an adjuster housing including an indicator;
a stud supported for linear movement within said housing, said stud having a position;
a drive means for moving said stud linearly within said housing without rotation of said stud; and
an aiming device carried by said stud such that linear movement of said stud causes linear movement of said aiming device with respect to said indicator, said aiming device including graduations which cooperate with said indicator to provide a visual indication of the position of said stud with respect to said adjuster mechanism housing, said aiming device further including an attachment means for securing said aiming device to said stud.

2. The mechanism of claim 1 wherein said housing includes a track for guiding said aiming device, said aiming device slidably engaging said track.

3. The mechanism of claim 2 wherein said graduations include a plurality of notches defined by said aiming device.

4. An adjuster mechanism comprising:
a housing including an indicator;
a stud supported for linear movement within said housing, said stud having a position;
an aiming device carried by said stud, said aiming device including graduations which cooperate with said indicator to provide a visual indication of the position of said stud, said graduations including a plurality of notches defined by said aiming device, said aiming device further including an attachment means for securing said aiming device to said stud, said housing including a track for guiding said aiming device, said aiming device slidably engaging said track, said attachment means including a clip having jaws which close on said stud, said clip including tabs which are pinched to open said jaws.

5. The mechanism of claim 4 further comprising a means for locating said aiming device at a default position, said means adapted to locate said clip only when said tabs are pinched.

6. The mechanism of claim 5 wherein said aiming device and said housing contrast in color.

7. The mechanism of claim 6 wherein said indicator includes an arrow extending over said aiming device to point to said graduations.

8. The mechanism of claim 3 wherein said attachment means includes a nut means for threadedly securing said aiming device to said stud.

9. The mechanism of claim 3 wherein said attachment means includes a leg defining an opening that is friction fit onto said stud.

10. The mechanism of claim 1 further comprising a gland seal fitted around said stud outside of said housing.

11. An adjuster mechanism comprising:
a housing including an indicator;
a stud supported for linear movement within said housing, said stud having a position, said stud defining a longitudinal groove;
a stationary anti-rotation member attached to said housing, said member engaging said groove to prevent rotation of said ball stud; and
an aiming device carried by said stud, said aiming device including graduations which cooperate with said indicator to provide a visual indication of the position of said stud, said aiming device further including an attachment means for securing said aiming device to said stud.

12. An adjuster mechanism comprising:
a housing;
a drive shaft rotatably mounted to said housing;
a threaded stud extending through said housing, said stud mounted for linear movement with respect to said housing, said stud defining a longitudinal groove;
a gear means contained within said housing for causing linear movement of said stud in response to rotation of said drive shaft; and
a cover mounted to said housing, said cover including an insert engaging said groove to prevent rotation of said stud with respect to said housing.

13. An adjuster mechanism comprising:
a housing;
a drive shaft rotatably mounted to said housing;
a threaded stud extending through said housing, said stud mounted for linear movement with respect to said housing, said stud defining a longitudinal groove;
a gear means contained within said housing for causing linear movement of said stud in response to rotation of said drive shaft; and
a cover mounted to said housing, said cover engaging said groove to prevent rotation of said stud with respect to said housing, said cover including an insert for engaging said groove, said insert defining an opening fitted over said stud, said insert further defining a tyne extending into said opening to engage said groove.

14. The mechanism of claim 13 wherein said insert includes an ear engaging a seat within said cover to prevent rotation of said insert.

15. The mechanism of claim 14 wherein said stud includes a pair of longitudinal grooves and said insert defines a pair of tynes extending into said opening to engage both of said grooves.

16. The mechanism of claim 15 wherein said tynes are lobed and said grooves are radial.

17. A headlamp comprising:
a headlamp housing defining a sealing bore;
a reflector contained within said headlamp housing;
an adjuster mechanism mounted to said headlamp housing, said adjuster mechanism including a gear housing and a stud extending from said gear housing through said sealing bore, said stud connected to said reflector;
a gland seated over said stud outside of said gear housing, said gland being in sealing engagement with said sealing bore, said gear housing, and said stud; and a means for centering said gear housing within said sealing bore.

18. The headlamp of claim 17 wherein said gland is an o-ring type seal.

19. A headlamp comprising:

a headlamp housing defining a sealing bore;

a reflector contained within said headlamp housing;

an adjuster mechanism mounted to said headlamp housing, said adjuster mechanism including a gear housing and a stud extending from said gear housing through said sealing bore, said stud connected to said reflector, said gear housing includes a slanted front bearing surface engaging said headlamp housing around said sealing bore, said slanted front surface centering said stud within said sealing bore; and a gland seated over said stud outside of said gear housing, said gland being in sealing engagement with said sealing bore and said stud, said gland being an o-ring type seal.

20. A headlamp comprising:

a headlamp housing defining a sealing bore;

a reflector contained within said headlamp housing;

an adjuster mechanism mounted to said headlamp housing, said adjuster mechanism including a gear housing and a stud extending from said gear housing through said sealing bore, said stud connoted to said reflector, said headlamp housing includes a slanted bearing surface around said sealing bore, said slanted bearing surface engaging said gear housing to center said stud within said bore; and a gland seated over said stud outside of said gear housing, said gland being in sealing engagement with said sealing bore and said stud, said gland being an o-ring type seal.

21. The headlamp of claim 20 wherein said headlamp housing includes a throat surrounding said sealing bore;

said gear housing includes a neck surrounding a portion of said stud, said throat receiving said neck and said gland.

22. The headlamp of claim 21 wherein said throat includes a reduced diameter portion for seating said gland, said gland being compressed between said stud and said reduced diameter portion of said throat to create a leaktight seal.

23. An adjuster mechanism comprising:

an adjuster housing including an integral indicator;

a stud supported for linear movement within said housing, said stud having a position;

an aiming device carried by said stud, said aiming device including a plurality of graduations, said aiming device moving linearly with said stud and cooperating with said indicator to provide a visual indication of the position of said stud; and a moving means for moving said stud linearly within said housing without rotation of said stud.

24. The adjuster mechanism of claim 23 wherein said moving means includes a drive shaft supported within said housing;

said adjuster mechanism further comprising a display rotatably fitted over said drive shaft, said display adapted to rotate freely with respect to said drive shaft, said aiming device including an arm operatively engaging said display thereby causing said display to rotate as said aiming device moves linearly.

25. The adjuster mechanism of claim 24 wherein said display includes a serrated collar and said arm includes a serrated portion engaging said serrated collar.

* * * * *

UNITED STATES PATENT AND TRADEMARK OFFICE
CERTIFICATE OF CORRECTION

PATENT NO. : 5,707,133
DATED : January 13, 1998
INVENTOR(S) : John E. Burton

It is certified that error appears in the above-indentified patent and that said Letters Patent is hereby corrected as shown below:

Column 11, Claim 20, Line 26:
  "connoted" should be --connected--

Signed and Sealed this

Ninth Day of June, 1998

Attest:

BRUCE LEHMAN

Attesting Officer    Commissioner of Patents and Trademarks